United States Patent [19]

Murashima et al.

[11] Patent Number: 5,467,158
[45] Date of Patent: Nov. 14, 1995

[54] FILM WINDING/REWINDING MECHANISM OF CAMERA

[75] Inventors: Nobuharu Murashima, Nara; Kenji Ishibashi; Dai Shintani, both of Sakai; Nobuyuki Taniguchi, Nishinomiya, all of Japan

[73] Assignee: Minolta Camera Kabushiki Kaisha, Osaka, Japan

[21] Appl. No.: 249,681

[22] Filed: May 26, 1994

Related U.S. Application Data

[63] Continuation of Ser. No. 988,011, Dec. 9, 1992, abandoned, which is a continuation of Ser. No. 755,184, Sep. 5, 1991, abandoned.

[30] Foreign Application Priority Data

| Sep. 7, 1990 | [JP] | Japan | 2-238416 |
| Sep. 7, 1990 | [JP] | Japan | 2-238417 |
| Sep. 12, 1990 | [JP] | Japan | 2-244886 |
| Sep. 18, 1990 | [JP] | Japan | 2-249881 |
| Sep. 18, 1990 | [JP] | Japan | 2-249882 |
| Oct. 26, 1990 | [JP] | Japan | 2-289441 |
| Oct. 26, 1990 | [JP] | Japan | 2-289443 |

[51] Int. Cl.⁶ .................................................. G03B 1/18
[52] U.S. Cl. ............................................................ 354/173.1
[58] Field of Search .................................... 354/400–409, 354/195.1, 195.12; 310/316, 317, 323, 228, 333; 318/116, 118

[56] References Cited

U.S. PATENT DOCUMENTS

| 4,560,263 | 12/1985 | Katsuma et al. | 354/195.1 |
| 4,663,556 | 5/1987 | Kumada | 310/333 |
| 4,812,699 | 3/1989 | Ogawa et al. | 310/316 |

FOREIGN PATENT DOCUMENTS

| 63-77039 | 4/1988 | Japan . |
| 1-279214 | 11/1989 | Japan . |
| 2-29724 | 1/1990 | Japan . |
| 2-69307 | 5/1990 | Japan . |

OTHER PUBLICATIONS

"Photographic Industries" Magazine, vol. 47, No. 488, published Dec. 1, 1989.

*Primary Examiner*—David M. Gray
*Attorney, Agent, or Firm*—Willian Brinks Hofer Gilson & Lione

[57] ABSTRACT

A film winding/rewinding mechanism of a camera driven by an ultrasonic wave motor. The winding driving section includes a cylindrical spool and a cylindrical first ultrasonic wave vibrator provided in the spool. A roller urged by a leaf spring is pressed against the peripheral surface of the spool, so that the peripheral surface of the vibrator contacts the inner surface of the spool at a point in the circumferential direction thereof. The film rewinding driving section includes a film rewinding fork, a cylindrical member mounted on the periphery of the rewinding fork, and a cylindrical second ultrasonic wave vibrator provided between the rewinding fork and the cylindrical member. The diameter of the outer circumference of the second ultrasonic wave vibrator is greater than the diameter of the outer circumference of the first vibrator. In winding/rewinding the film, the cylindrical member is urged by the tension of the film, so that the peripheral surface of the cylindrical member contacts the peripheral surface of the second vibrator contacts at a point in the circumferential direction thereof. In winding the film, a voltage is applied to the first vibrator to rotate the spool. In rewinding the film, a voltage is applied to the second vibrator to rotate the fork.

6 Claims, 15 Drawing Sheets

FILM WINDING/REWINDING MECHANISM OF CAMERA

This application is a continuation application of Ser. No. 07/988,011, filed Dec. 9, 1992, now abandoned, which, in turn, is a continuation application of Ser. No. 07/755,184, filed Sep. 5, 1991, now abandoned.

BACKGROUND OF THE INVENTION

1. Field of the invention

The present invention relates to a film winding/rewinding mechanism of a camera using an ultrasonic wave motor.

2. Description of the related art

A film winding/rewinding mechanism of a camera using an ultrasonic wave motor as the driving source has been proposed. For example, Japanese Patent Laid-Open Publication No. 2-29724 discloses a film winding/rewinding mechanism using progressive wave type ultrasonic wave motors, one of which drives the winding side and the other of which drives the film rewinding side. In this winding/rewinding mechanism, the driving side causes a vibrator to generate progressive waves on the surface thereof so as to impart a predetermined rotational force to a rotor, i.e. a film winding spool, while the driven side causes a vibrator to generate standing waves so as to reduce the resistance to the rotor.

Japanese Patent Laid-Open Publication No. 63-77039 discloses a winding/rewinding mechanism in which a clutch is used to adjust the resistance to the rotor of the driven side.

According to the winding/rewinding mechanism disclosed in Japanese Patent Laid-Open Publication No. 2-29724, both the film winding driving section and film rewinding driving section are provided with a circuit for generating standing waves in addition to a circuit for generating progressive waves. That is, in both the film winding and film rewinding operations, progressive waves are generated by the driving side and standing waves are generated by the driven side. Since it is necessary to operate two circuits simultaneously, the mechanism has a high consumption of power.

According to the winding/rewinding mechanism disclosed in Japanese Patent Laid-Open Publication No. 63-77039, the clutch is used to reduce the force for holding the rotor of the driven side. Therefore, the winding/rewinding mechanism requires a great space.

SUMMARY OF THE INVENTION

Accordingly, an essential object of the present invention is to provide a film winding/rewinding mechanism of a camera which consumes small amount of power and is compact.

In accomplishing these and other objects, there is provided a film winding/rewinding mechanism of a camera comprising: a film winding driving section and a film rewinding driving section. The film winding driving section comprises a cylindrical spool around which a film is to be wound, a cylindrical first ultrasonic wave vibrator having an outer diameter smaller than the inner diameter of the spool and provided in the hollow space of the spool, and pressing means for pressing the spool against the first vibrator so that the outer surface of the first vibrator constantly contacts the inner surface of the spool at a point in the circumferential direction thereof. The film rewinding driving section comprises a film rewinding fork, mounted in a camera body, for rotating the film winding shaft of a film cartridge, a cylindrical member mounted on the periphery of the rewinding fork so that the loosely cylindrical member rotates together with the rewinding fork, and a cylindrical second ultrasonic wave vibrator provided in a space between said film rewinding fork and said cylindrical member and fixed on the camera body and having an outer diameter smaller than the inner diameter of the cylindrical member and an inner diameter greater than the outer diameter of the rewinding fork, and the diameter of the outer circumference of the second vibrator is greater than the diameter of the outer circumference of the first vibrator.

In winding/rewinding the film, the cylindrical member is urged by the tension of the film, so that the inner surface of the cylindrical member contacts the peripheral surface of the second vibrator at a point in the circumferential direction thereof.

According to the above construction, in winding a film, a voltage is sequentially applied to the first vibrator of the winding driving section at different positions in the circumferential direction thereof. Therefore, the expansion direction of the first vibrator moves circumferentially according to voltage-applied positions with the spool rotating as a rotor in contact with the first vibrator at a point thereof. At this time, since the second vibrator of the rewinding driving section contacts the rewinding fork at a point, the resistance to the film winding operation is small. Therefore, only voltage application to the winding driving section facilitates the winding of the film.

In rewinding the film, since the first vibrator contacts the inner peripheral surface of the spool of the winding driving section, the frictional force between the spool and the first vibrator acts as a resistance to the film rewinding operation. However, since the diameter of the second vibrator is greater than that of the first vibrator, film rewinding torque is greater than the resistance of the spool applied to the film. Therefore, only voltage application to the second vibrator facilitates the rewinding of the film.

Thus, in winding and rewinding the film, a voltage is applied to the vibrator of the driving side. It is unnecessary to generate standing waves in the driven side or cut off the resistance to the rotor by means of a clutch mechanism. Therefore, power consumption is small and a compact camera can be manufactured.

BRIEF DESCRIPTION OF THE DRAWINGS

These and other aspects and features of the present invention will become clear from the following description taken in conjunction with the preferred embodiments thereof with reference to the accompanying drawings, in which:

FIGS. 1 through 3 show a film winding/rewinding mechanism of a camera according to an embodiment of the present invention, in which:

FIG. 1 is an exploded perspective view showing the film winding/rewinding mechanism;

FIG. 2 is a partially sectional view seen from the back of the camera body;

FIG. 3 is a sectional view taken along a line III—III of FIG. 2 when the back cover of the camera body is closed;

FIGS. 4 through 12 show a single-lens reflex camera having a lens driving mechanism, a diaphragm driving mechanism, a shutter mechanism, and a mirror driving mechanism according to another embodiment of the present invention, in which:

FIG. 4 is a plan view showing the construction of the camera body;

FIG. 5 is a front view showing the construction of the camera body;

FIG. 6 is a sectional view showing the lens driving mechanism of the camera;

FIG. 7 is a control circuit diagram of the lens driving mechanism;

FIG. 8 is a control circuit diagram of the lens driving mechanism provided with a composite vibrator type ultrasonic wave motor serving as the driving source thereof;

FIG. 9 is an exploded perspective view of the diaphragm driving mechanism of the camera;

FIG. 10 is a perspective view seen from the rear side of a mirror box provided with the mirror driving mechanism of the camera;

FIG. 11 is a sectional view showing the construction of the mirror driving mechanism of the camera;

FIG. 12 is an exploded perspective view of the shutter mechanism of the camera;

DETAILED DESCRIPTION OF THE INVENTION

Figure 1:
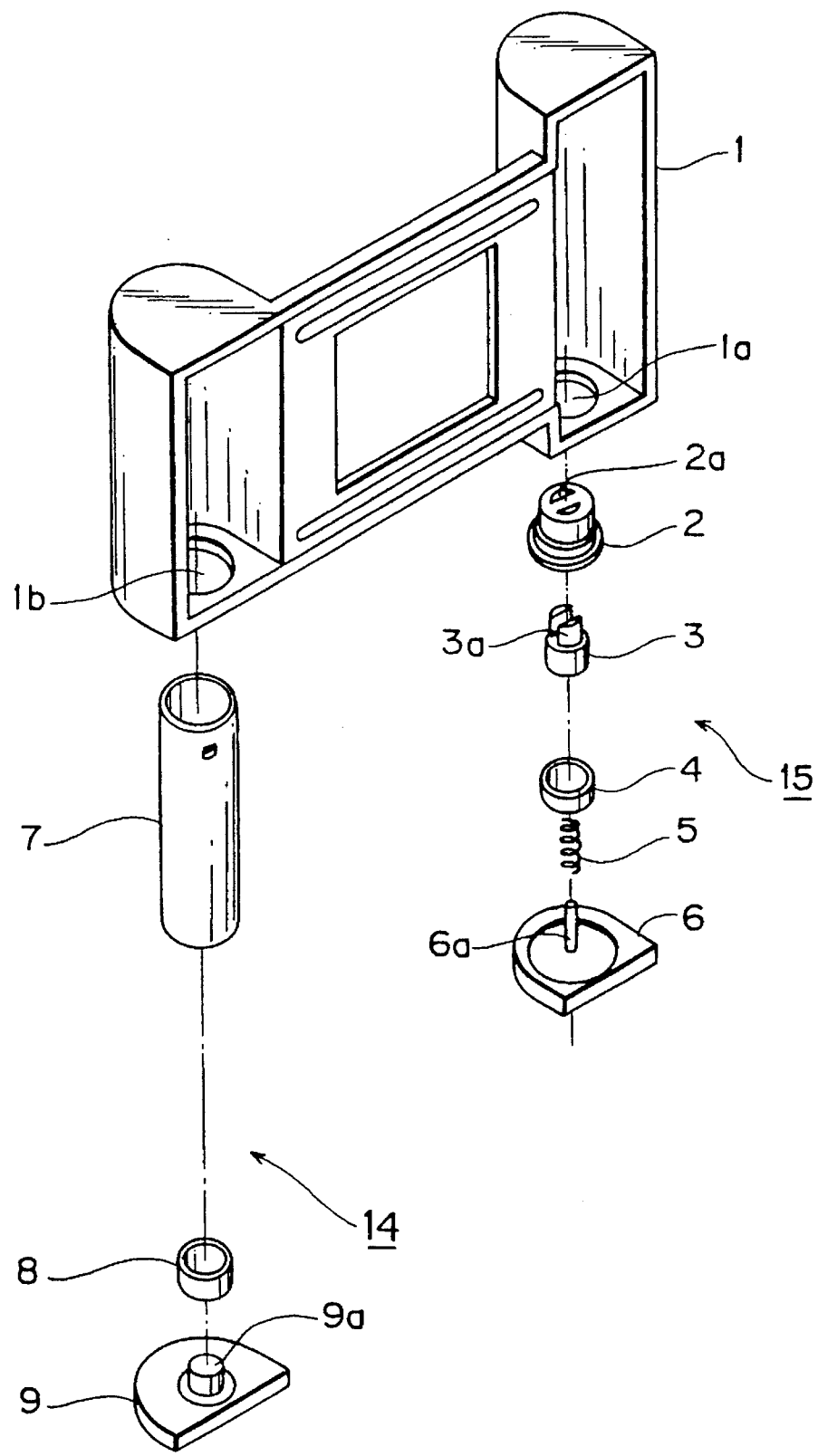
Figure 2:
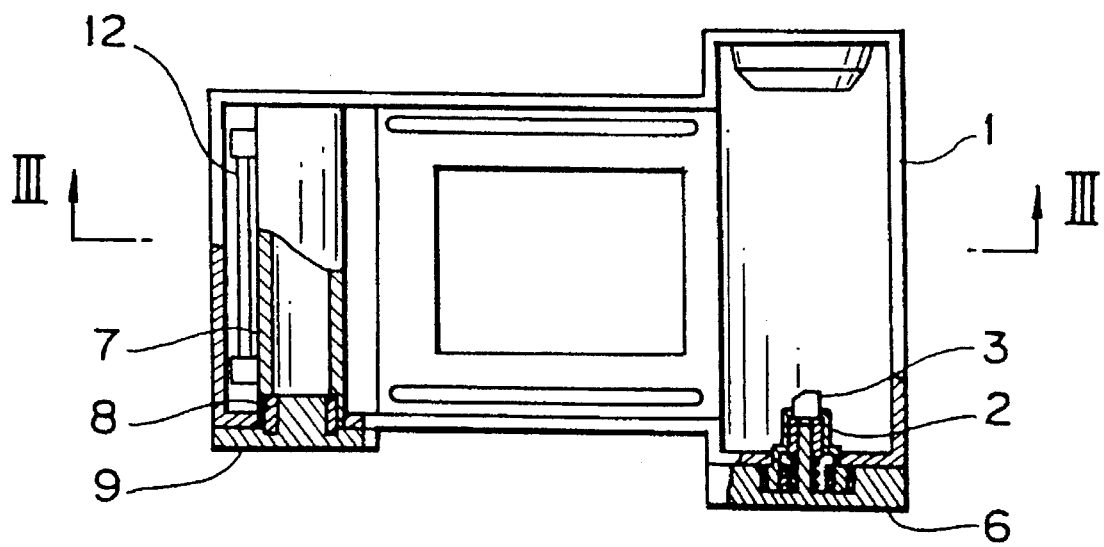
Figure 3:
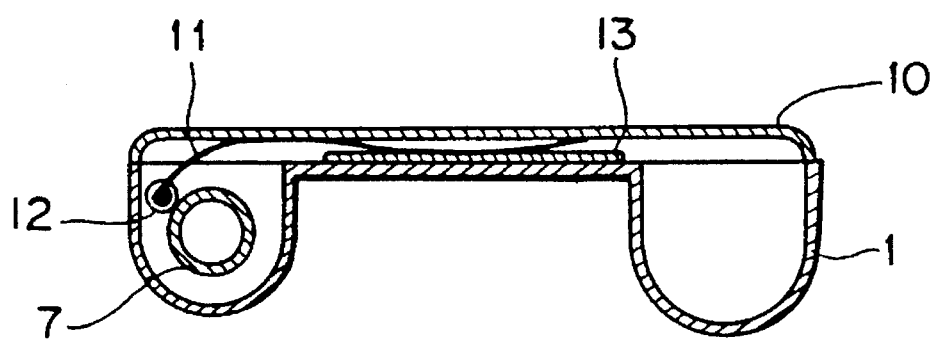
Figure 3A:
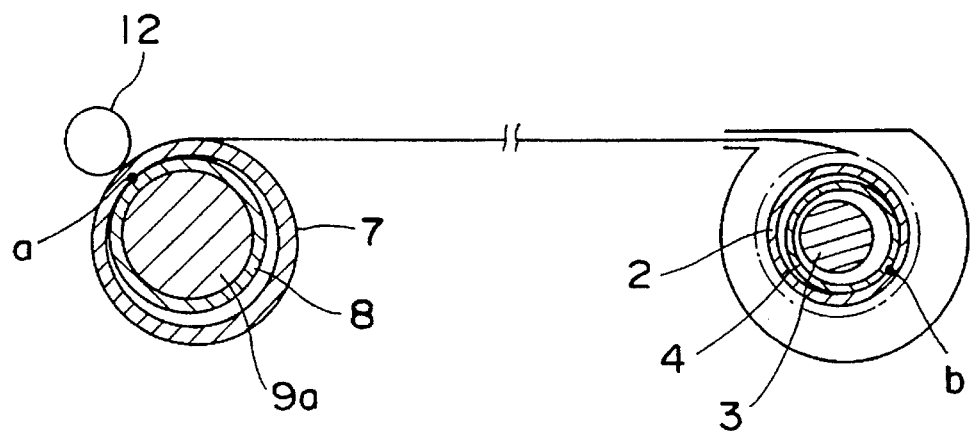
FIG. 3A is a explanatory section showing an essential part of the winding/rewinding mechanism.

Referring to FIGS. 1 and 3, description is made below on a film winding/rewinding mechanism of a camera using an ultrasonic wave motor according to an embodiment of the present invention.

The camera comprise a camera body 1, a winding driving section 14, and a rewinding driving section 15. Throughholes 1a and 1b are formed on the lower surface of the body 1 in order to constitute the driving sections 14 and 15 in the body 1.

Figure 3B:
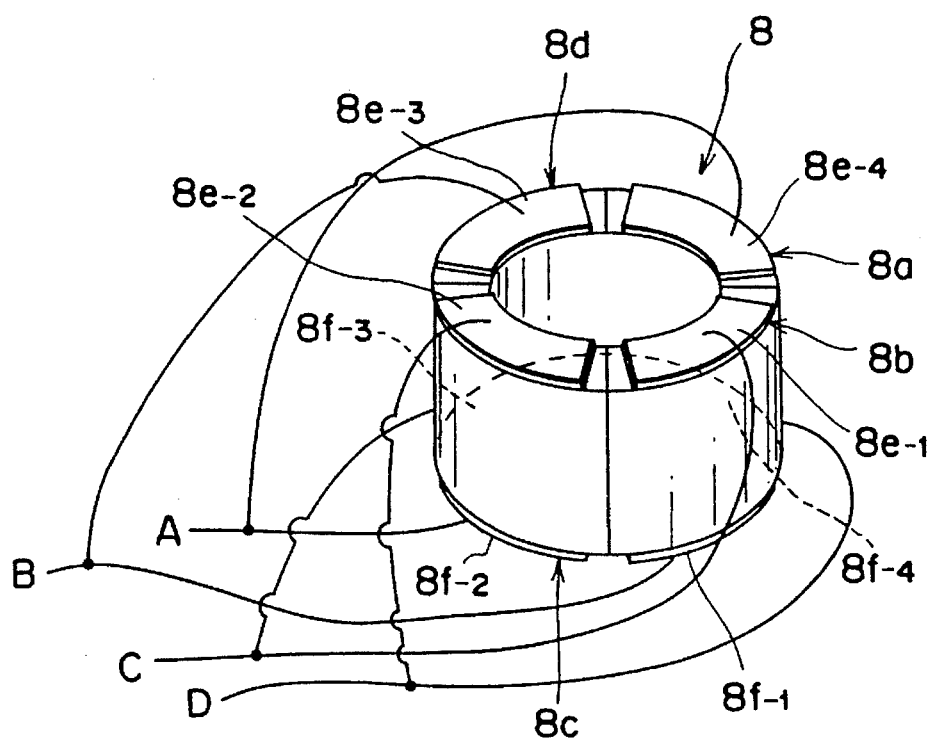
FIG. 3B is a perspective view showing an ultrasonic move motor, i.e. a vibrator.

The driving section 14 comprises a cylindrical spool 7, a first ultrasonic wave vibrator 8, the outer diameter of which is set to contact the inner surface of the spool 7 at a point "a" thereof, a first holding plate 9 for holding the spool 7 and the first vibrator 8 in the body 1, and a roller 12 urged toward the center of the spool 7 by a leaf spring 11 mounted on a back cover 10. As shown in FIG. 3B, the first vibrator 8 comprises a plurality of sectors 8a, 8b, 8c and 8d which forms a cylindrical body of vibrator. Each sector 8a–8d includes a piezoelectric element and a pair of electrodes 8e-1, 8f-1; 8e-2, 8f-2; 8e-3, 8f-3; and 8e-4, 8f-4 respectively fixed to the upper and bottom surfaces of the piezoelectric element. The first vibrator 8 is mounted on a pin-shaped holding portion 9a provided on the first holding plate 9. The first vibrator 8 is loosely inserted into the spool 7. As shown in FIG. 3, a film pressing member 13 is mounted on the leaf spring 11. The film passes between the film pressing member 13 and the body 1 and is wound around the spool 7 with the roller 12 pressing the film against the spool 7.

The rewinding mechanism 15 comprises a film rewinding fork 3, a fork guide 2 for guiding the fork 3 vertically, a second ultrasonic wave vibrator 4, the outer diameter of which is set to contact the inner surface of the folk guide 2 at a point "b" thereof, and a second holding plate 6 mounted on the body 1 with a spring 5, for urging the folk 3 upward, held on a shaft 6a thereof. The vibrator 4 is fixed on the plate 6 not so as to radially move. The inner diameter of the vibrator 4 is larger than the outer diameter of the fork 4. The folk 3 comprises a pair of claws 3a engaging an unshown film cartridge. Each claw 3a projects into the body 1 through each opening 2a of the folk guide 2. The second vibrator 4 has the same configuration as the first vibrator 8. The outer diameter of the second vibrator 4 is a little larger than that of the first vibrator 8.

The film is wound or rewound as follows: Positive and negative voltages are sequentially applied to a pair of electrodes (for example, 8e-1(+), 8f-1(−); 8e-3(−), 8f-3(+) →8e-2(+), 8f-2(−); 8e-4(−), 8f-4(+)→...), of the second vibrator 4 or the first vibrator 8, arranged in the circumferential direction thereof so that the expansion direction of the first vibrator 8 or the second vibrator 4 moves circumferentially. As a result, the folk guide 2 rotates in contact with the second vibrator 4 in rewinding the film and the spool 7 rotates in contact with the first vibrator 4 in winding the film.

In winding the film, since the tension of the film is very small, it can be easily wound by applying a voltage to the first vibrator 8.

In rewinding the film, supposing that the force for urging the roller 12 toward the center of the spool 7 is F, the friction coefficient between the spool 7 and the first vibrator 8 is μ, the tension of the film in rewinding it is F', the resistant force of the spool 7 is Ta, torque for rewinding the film is Tb, the diameter of the first vibrator 8 is $r_1$, and the diameter of the second vibrator 4 is $r_2$, Force Ta of the spool 7: Ta=μ.F.$r_1$ Torque Tb for rewinding the film: Tb=F'.$r_2$ Tension F' of the film in rewinding it: F'=μ.F Therefore, torque Tb: Tb=μ.F.$r_2$ As described previously, $r_2$ is greater than $r_1$. Therefore, torque Tb for rewinding the film is greater than force Ta of the spool 7. Therefore, the film can be rewound by applying a voltage to the second vibrator 4.

According to the above-described embodiment, the film can be wound or rewound by vibrating the vibrator of the driving side. That is, it is unnecessary to provide the camera body with an electric circuit for generating standing waves or a clutch for reducing the film resistant force of the driven side. Therefore, the film can be wound or rewound without consuming much energy and a compact camera can be manufactured.

Referring to FIGS. 4 through 12, description is made on a single-lens reflex camera comprising a lens driving mechanism, a diaphragm driving mechanism, a shutter mechanism, and a mirror driving mechanism. These mechanisms utilize ultrasonic waves.

Figure 4:
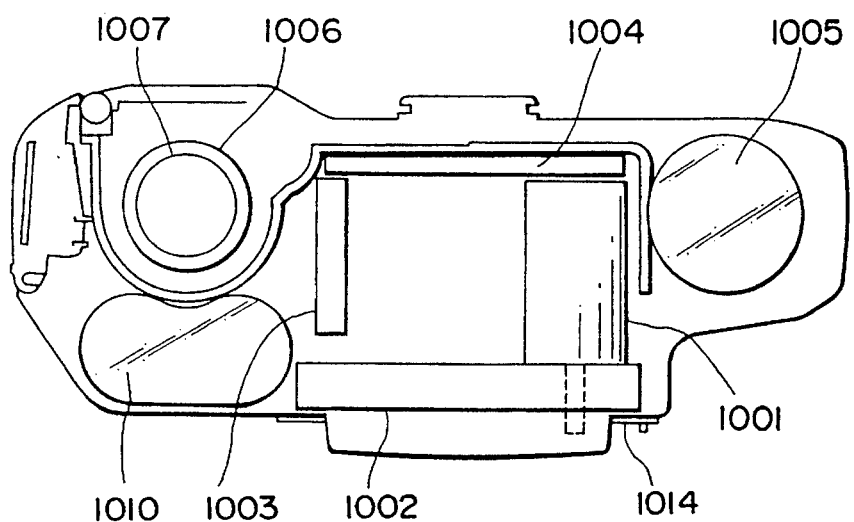
Figure 5:
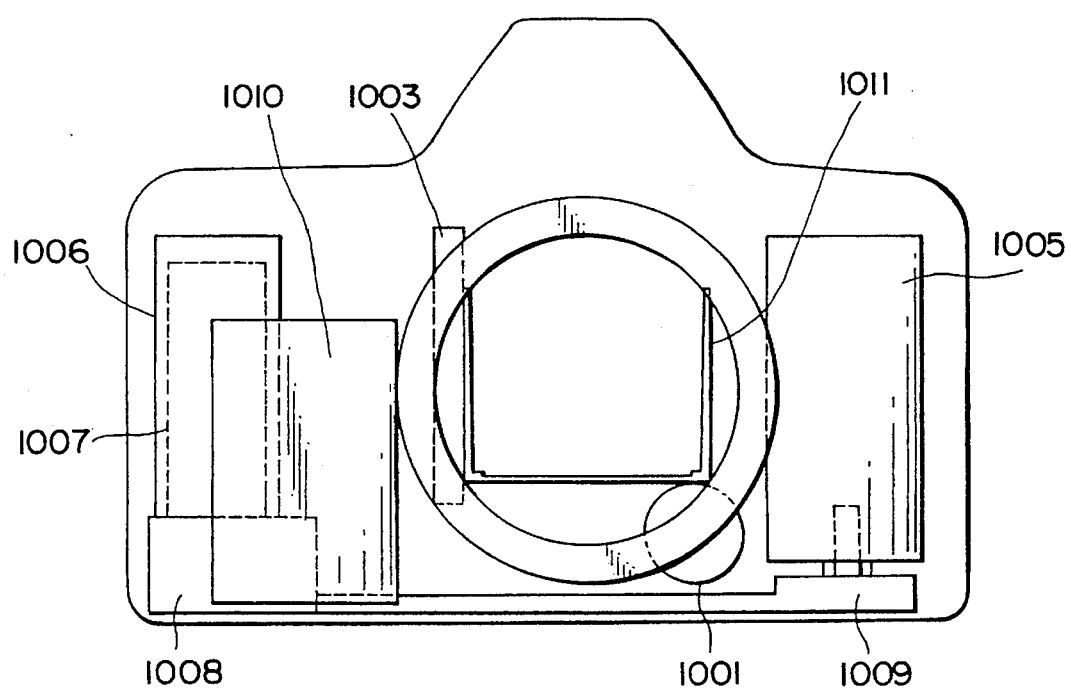

FIGS. 4 and 5 are a plan view and a front view showing the construction of the camera body. The camera body comprises an automatic focusing type lens driving mechanism 1001, a diaphragm driving mechanism 1002, a mirror driving mechanism 1003, a shutter mechanism 1004, a film cartridge accommodating chamber 1005, a spool 1006, a film winding/rewinding motor 1007, a film winding mechanism 1008, a film rewinding mechanism 1009, a battery chamber 1010, and a mirror box 1011. The mechanisms 1001 through 1004 are provided with a different type ultrasonic wave motor, respectively serving as the driving source.

Figure 6:
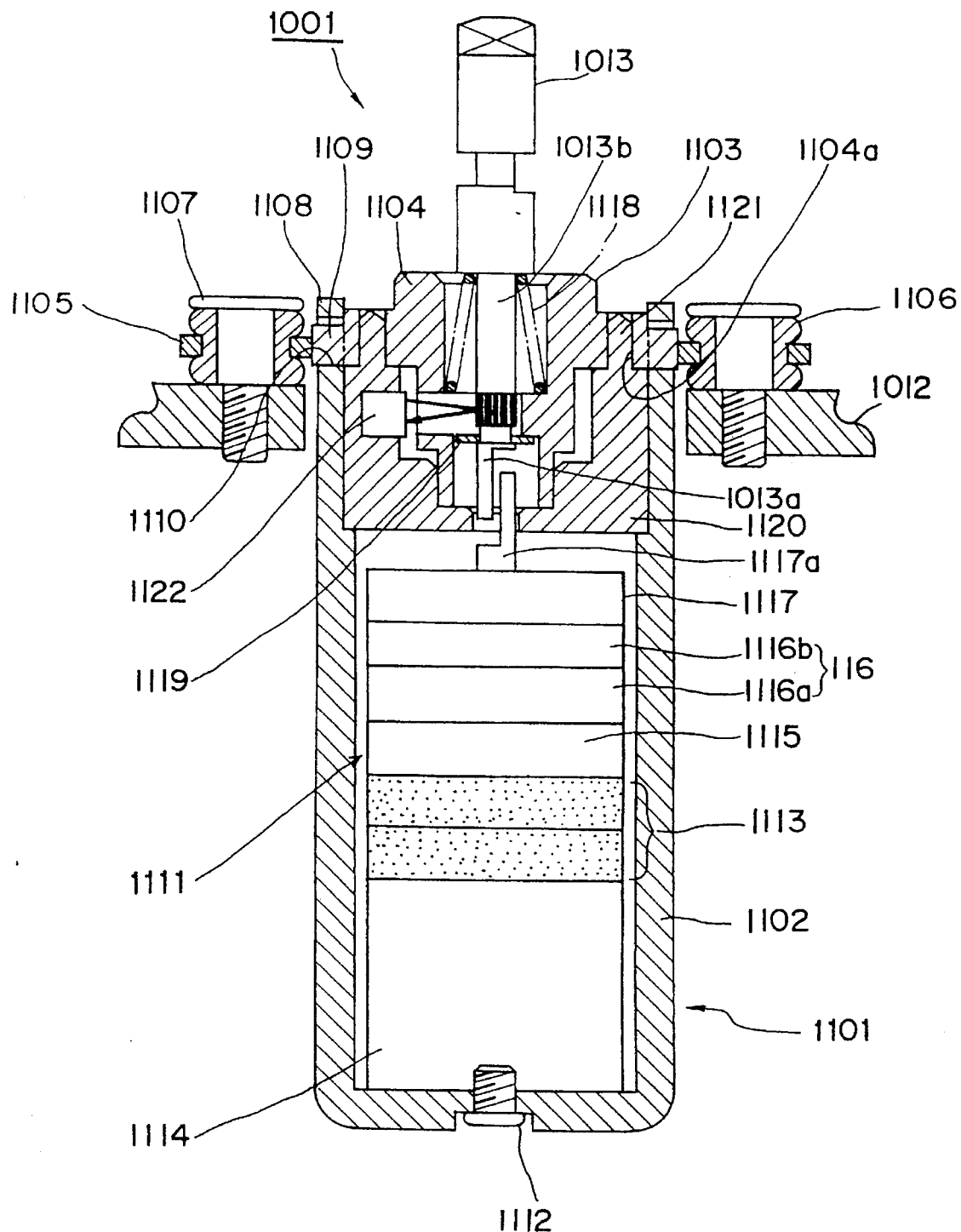

First, the lens driving mechanism 1001 is described below referring to FIG. 6.

Reference numeral 1012 denotes the front frame, of the mirror box 1011, for mounting the lens driving mechanism 1001 thereon, and 1013 denotes a coupler, projecting from a lens mount provided on the front surface of the camera body, for driving an interchangeable lens for the purpose of a focusing operation.

Reference numeral 1101 denotes the casing, of the lens driving mechanism 1001, comprising a cylindrical member 1102 and a mounting member 1103. The mounting member 1103 comprises a boss 1104 and a plurality of mounting plates 1105 provided in the periphery of the boss 1104. A vibration-proofing rubber 1106 is inserted in an opening formed in each of the mounting plates 1105 and then, the plates 1105 is fixed to the front frame 1012 of the mirror box 1011 with a screw 107. An opening is formed on the upper end portion of the cylindrical member 1102 so that the mounting member 1103 is fixed to the cylindrical member 1102. The end surface 1110 of the open-end is provided with a plurality of hook-shaped locking claws 1108. The boss 1104 of the mounting member 1103 is provided with a locking portion 1109 positioned in correspondence with the claw 1108. The mounting member 1103 can be fixed to the cylindrical member 1102 by the engagement between the claw 1108 and the locking portion 1109 made after the mounting member 1103 is fitted over the cylindrical member 1102 in the axial direction thereof.

A torsion connector type ultrasonic wave motor 1111 is mounted in the cylindrical member 1102 at the bottom thereof with a screw 1112. In the motor 1111, a piezoelectric element 1113 generating a longitudinal mode vibration is mounted on a base 1114 and connected with a torsion connector 1116 via a horn 1115. The connector 1116 comprises a disk 1116a having a groove (not shown) formed on the horn side and a beam 1116b intersecting the groove diagonally and fixed to the upper surface of the disk 1116a. Displacement is generated on the upper surface of the beam 1116b by resultant force of the longitudinal mode vibration generated by the piezoelectric element 1113 and torsional vibration. As a result, rotation torque is transmitted to a rotor 1117 pressed against the connector 1116. The rotational direction of the rotor 1117 is in either way by appropriately selecting the frequency thereof as disclosed in Japanese Patent Laid-Open Publication No. 61-49670.

A shaft 1117a projects from the center of the upper surface of the rotor 1117. The upper end portion of the shaft 1117a is semi-cylindrical. The lower end portion 1013a of the coupler 1013 is also semi-cylindrical. The rotational force of the rotor 1117 is transmitted to the coupler 1013 by the shaft 1117a and the lower end portion 1013a in combination with each other. The coupler 1013 is axially movably held in the mounting member 1103 by the operation of a spring 1118 and a stop ring 1119. The shafts 1121 for positioning a holding member 1120 are inserted into the openings 1104a formed in the boss 1104 so as to mount the holding member 1120 for holding an encoder 1122 in the mounting member 1103. Black and white patterns are formed on the shaft 1013b of the coupler 1013 so that the encoder 1122 detects the rotational amount of the coupler 1013 by light projected therefrom and returned thereto from the shaft 1013b along the course as shown by the arrow of FIG. 6.

The above-described construction is formed in the following order. The mounting member 1103, the coupler 1013, and the holding member 1120 for holding the encoder 1122 are assembled together as a unit. Then, the cylindrical member 1102 provided with the ultrasonic wave motor 1111 and the mounting member 1103 are assembled together. Then, the mounting member 1103 is fixed to the front frame 1012 of the mirror box 1011. In this construction without a reduction mechanism, the lens can be driven quietly by means of the coupler driven by standing wave type ultrasonic wave motor.

Figure 7:
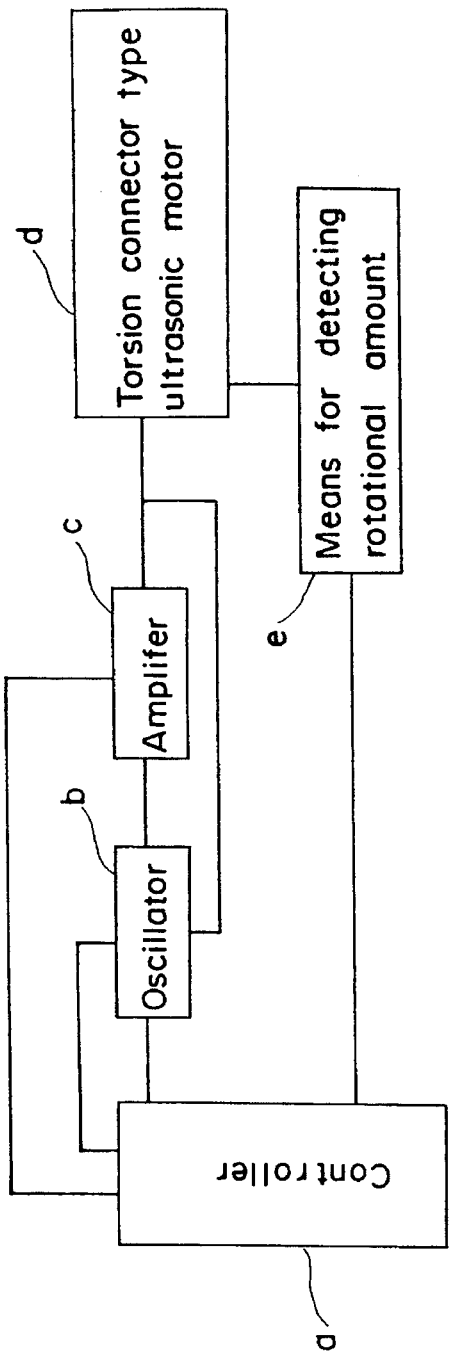

FIG. 7 shows the control circuit of the lens driving mechanism 1001. The control circuit comprises a controller (a), an oscillator (b), an amplifier (c), a connector type ultrasonic wave motor (d), and a means (e) including the encoder 1122 for detecting the rotation amount of the motor (d). The motor (d) rotates either way upon application of an AC voltage thereto via an oscillator (b) controlled by the controller (a). The rotational speed of the motor (d) is controlled by a voltage appropriately amplified by the amplifier (c) controlled by the controller (a). The voltage to be applied from the amplifier (c) to the motor (d) is monitored to keep the oscillation frequency generated by the oscillator (b) at a predetermined value. In order to control the rotational position of the motor (d), the rotational amount of the motor (d) is detected by the detecting means (e) and a signal out therefrom is inputted to the controller (a).

Figure 8:
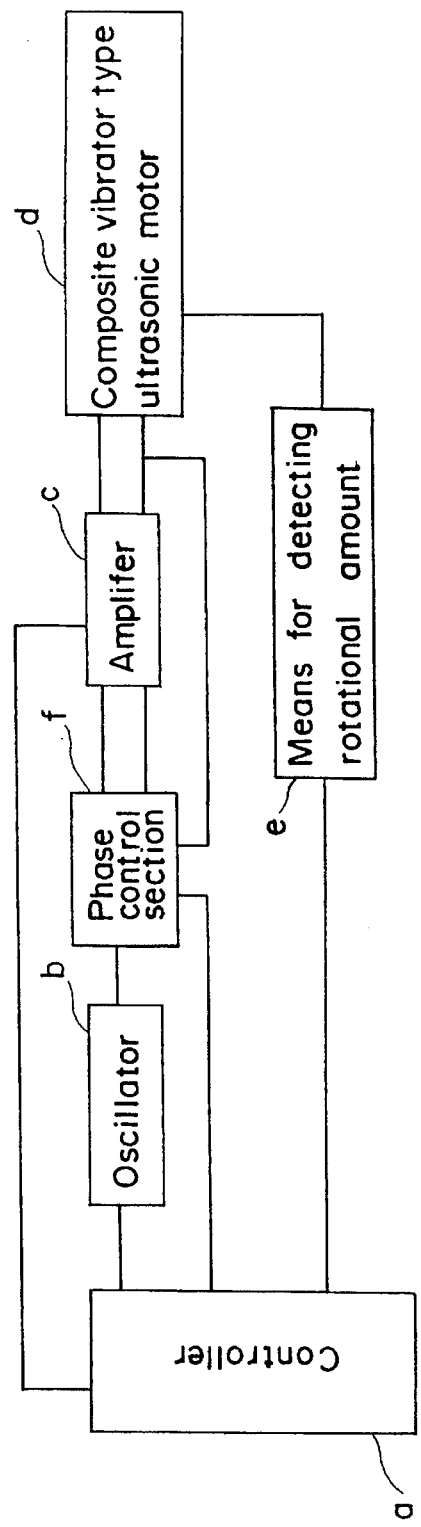

Instead of the torsion connector type ultrasonic wave motor, a composite vibrator type ultrasonic wave motor as described in page 34 of "Nikkei Mechanical" published on Mar. 20, 1989 in Japan may be used. This type ultrasonic wave motor comprises a piezoelectric element for generating longitudinal vibration and a piezoelectric element for generating torsional vibration. Therefore, the rotor can be rotated in either way by taking a timing so that the piezoelectric element for generating the torsional vibration is twisted in a desired direction when the piezoelectric element for generating the longitudinal vibration expands. In order to use the composite vibrator type ultrasonic wave motor, as shown in FIG. 8, a control circuit is provided with a phase control means (f). The oscillation timing of each piezoelectric element is taken by the phase control means (f) and the controller (a) controls the oscillator (b), the amplifier (c), and the detecting means (e). Thus, the rotation of the motor (d) is controlled.

In the above construction, a sliding mechanism which slides upon application of a load more than a predetermined value may be provided between the coupler 1013 and the rotor 1117. This construction prevents sliding between the rotor 1117 and the connector 1116 (stator) even though an overload is applied to the ultrasonic wave motor, namely, it prevents the generation of a abrasion therebetween. A standing wave type ultrasonic wave motor as described above is applicable not only to an interchangeable lens driven via a coupler as described above, but also to a photographing lens incorporated in a camera body as well as a lens of the finder optical system thereof.

Figure 9:
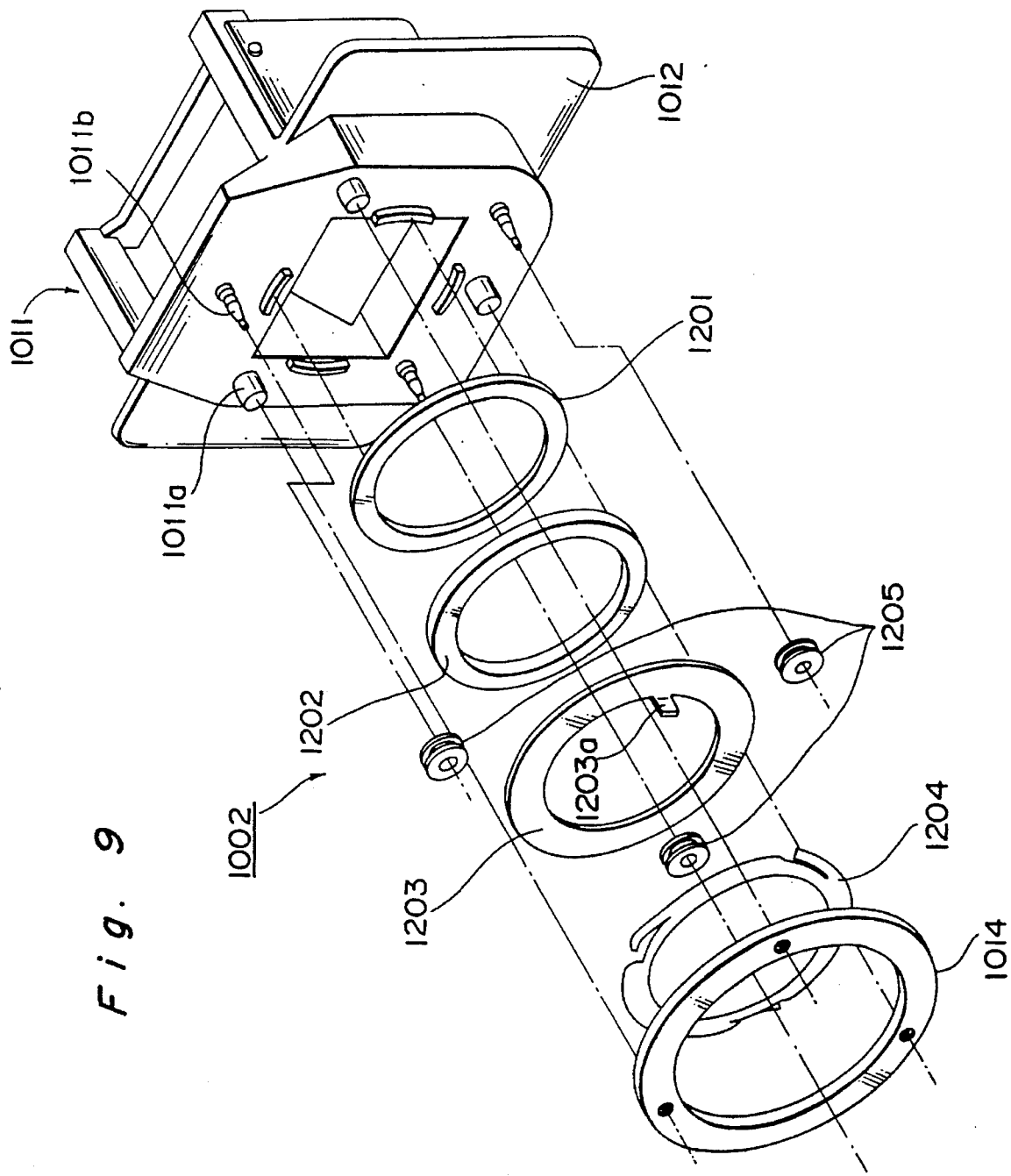

The diaphragm driving mechanism 1002 is described with reference to an exploded perspective view thereof shown in FIG. 9.

The diaphragm driving mechanism 1002 is driven by a ring-shaped progressive wave type ultrasonic wave motor and mounted on the front portion of the mirror box 1011 in order to control the aperture size of a photographing lens. The construction of the diaphragm driving mechanism 1002 is described below.

The mirror box 1011 is provided with a ring-shaped piezoelectric element 1201 and a ring-shaped elastic member 1202, serving as a stator, adhered to the piezoelectric element 1201. The piezoelectric element 1201 has electrodes polarized in the circumferential direction thereof, similarly to the vibrator 8 as shown in FIG. 3B. There is provided in front of the ring-shaped elastic member 1202 a diaphragm ring 1203, serving as a rotor, having a diaphragm driving lever 1203a which engages a diaphragm lever (not shown) provided on the photographing lens so as to change the aperture size of the diaphragm. The lens mount 1014 is mounted on a boss 1011a provided on the front surface of the mirror box 1011 with a screw through a pressing spring 1204. Thus, the above-described members are held between the mirror box 1011 and the lens mount 1014 with the diaphragm ring 1203 pressed against the elastic member 1202. Rollers 1205 are mounted on each pin 1011b provided on the front surface of the mirror box 1011 with the rollers 205 in contact with the periphery of the diaphragm ring 1203.

In this construction, a voltage is appropriately applied to the electrodes to generate progressive waves traveling in a direction on the surface of the elastic member 1202. As a result, the diaphragm ring 1203 pressed against the surface of the elastic member 1202 rotates in the direction opposite to the travel direction of progressive waves. When a voltage is reversely applied in polarity, the diaphragm ring 1203 rotates in the direction opposite to the rotation direction thereof. Thus, upon application of a voltage, the diaphragm driving lever 1203a is rotated clockwise or counterclockwise to appropriately operate the diaphragm lever of the photographing lens. Thus, the aperture size of the photographing lens can be controlled.

The diaphragm driving mechanism as described above eliminates the provision of a speed reducing mechanism or a charge mechanism of a spring for the diaphragm unlike the conventional mechanism. Therefore, power can be transmitted efficiently and a prompt driving is possible. Further, the interval between photographing-taking operations can be shortened in continuous photographing. Since it is unnecessary to provide the speed reducing mechanism in a camera body, as described above, parts for emitting flashlight may be provided in the space for placing the speed reducing mechanism. Thus, a compact camera having many functions can be manufactured.

The mirror driving mechanism 1003 is described with reference to FIGS. 10 and 11.

Figure 10:
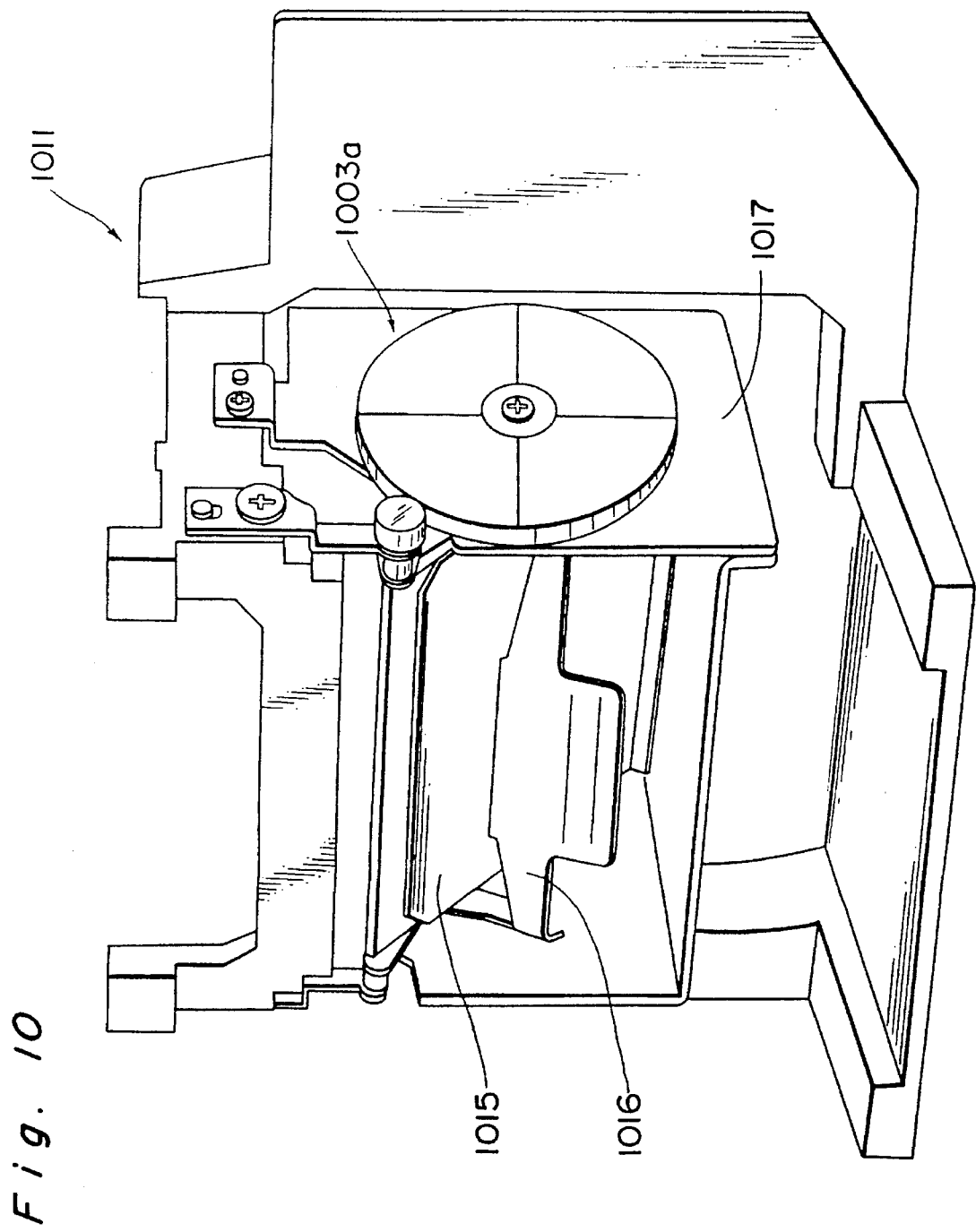

FIG. 10 is a perspective view seen from the rear side of the mirror box 1011. The mirror driving mechanism 1003 is mounted on the side wall 1017 of the mirror box 1011. FIG. 11 is a sectional view showing the construction of the mirror driving mechanism 1003.

Referring to FIG. 10, the driving mechanism 1003 comprises a main mirror 1015, composed of a half mirror, for guiding a part of lights which have passed through the photographing lens to the finder optical system and a sub-mirror 1016 for guiding light which has passed through the main mirror 1016 to a distance measuring element not shown. The mirror driving mechanism 1003 is provided with an electrostrictive revolution vibrator type ultrasonic wave motor as described in page 38 of "Nikkei Mechanical" published on Mar. 20, 1989 in Japan in order to move each mirror 15 and 16 upward simultaneously at exposure time.

Figure 11:
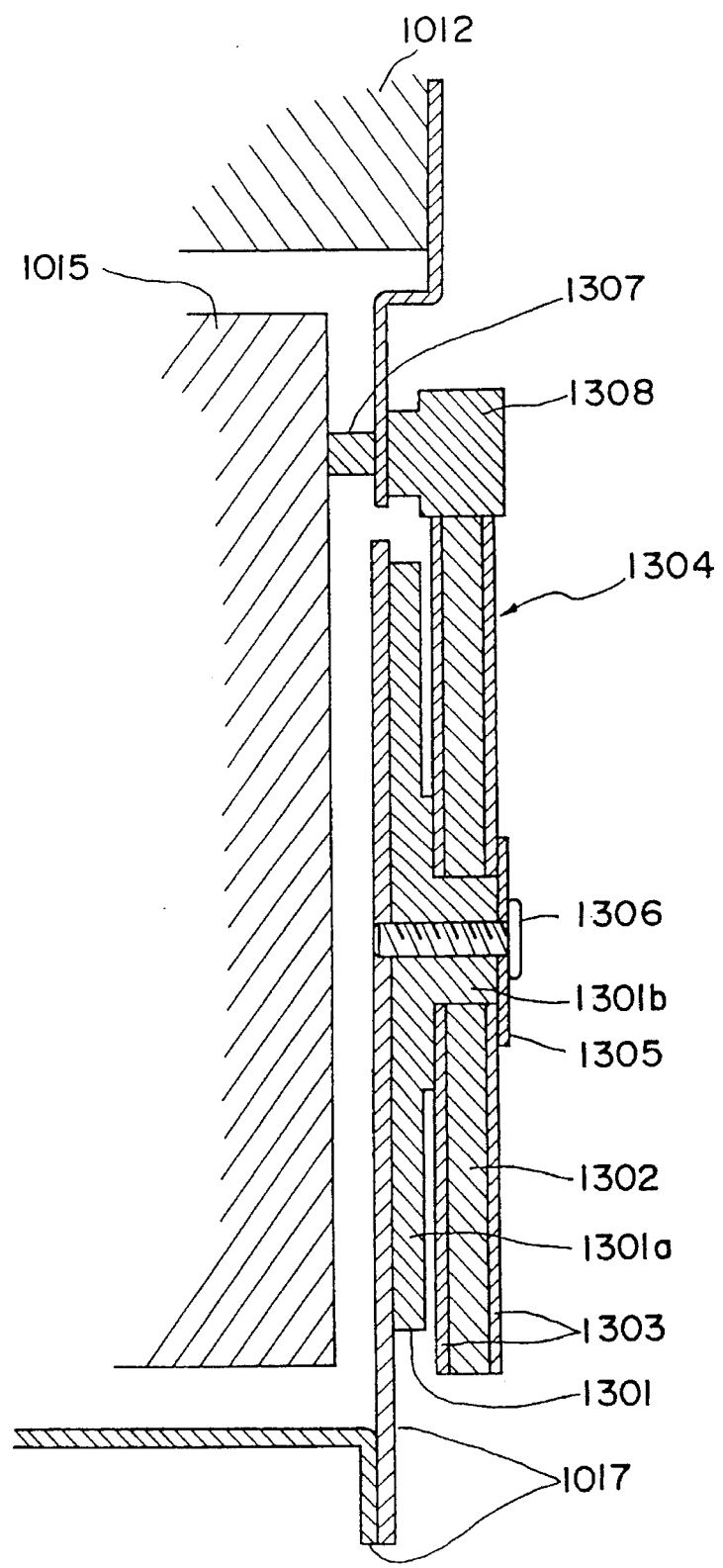

As sown in FIG. 11, the ultrasonic wave motor comprises a supporting member 1301 comprising a base 1301a and a supporting shaft 1301b, a stator 1304 comprising four-divided electrodes 1303 stuck to both surfaces of a disk-shaped piezoelectric element 1302 fitted over the supporting shaft 1301b, and a rotor consisting of a supporting shaft 1307 of the mirror 1015. The supporting member 1301 and the stator 1304 are fixed to the side wall 1017 of the mirror box 1011 with an end plate 1305 and a bolt 1306. An end portion 1308 of the supporting shaft 1307 is in contact with the stator 1304.

In this construction, positive and negative voltages are sequentially applied to the four pairs of electrodes 1303 clockwise or counterclockwise. As a result, a part of the piezoelectric element corresponding the electrode, to which the positive voltage has been applied, expands and the other part of the piezoelectric element corresponding the other electrode, to which the negative voltage has been applied, contracts. Thus, the expanded part is sequentially moved to rotate the rotor 1308 in contact with the peripheral surface of the stator 1304.

According to the above-described construction, the mirror 1015 can be driven by the motor not through a speed reducing mechanism or a cam mechanism unlike the conventional mechanism. Therefore, a compact camera is obtainable and power can be efficiently transmitted. Further, unlike the conventional mechanism in which a mirror is driven by releasing the charge of the spring for mirror, time lag in a shutter release can be shortened, i.e., the mirror can be prevented from moving overpassing a predetermined stop position by appropriately controlling the moving speed of the mirror immediately before the completion of the upward or downward movement thereof.

Figure 12:
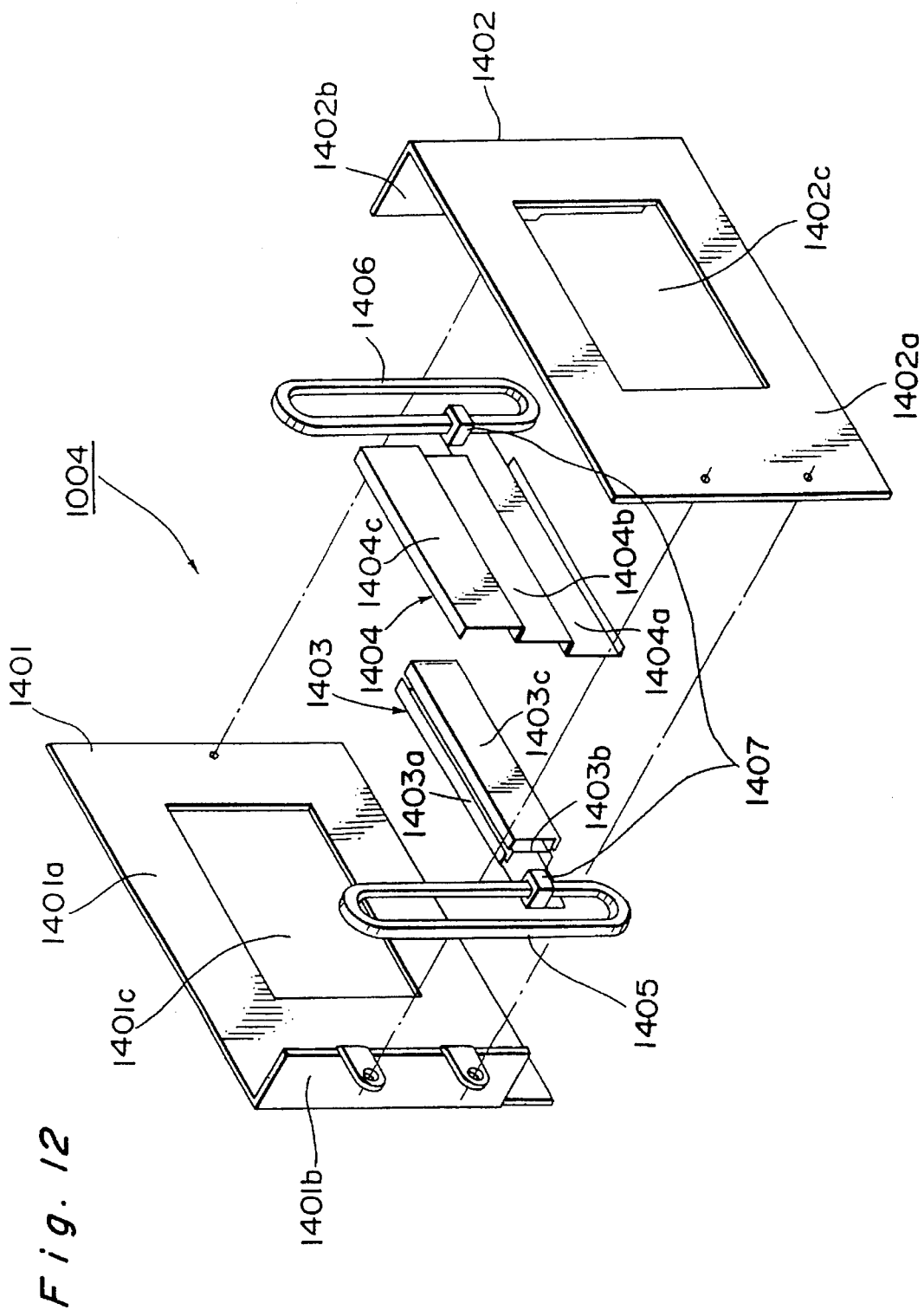

The shutter mechanism 1004 is described below with reference to FIG. 12.

The shutter mechanism 1004 comprises a first cover 1401 and a second cover 1402 fixed to each other. The first cover 1401 comprises a first wall 1401a perpendicular to the optical axis and a second wall 1401b parallel with the optical axis. The second cover 1402 comprises a first wall 1402a perpendicular to the optical axis and a second wall 1402b parallel with the optical axis. An opening 1401c and an opening 1402c are formed through the first walls 1401a and 1402a according to an exposure area. The shutter curtain is composed of a second curtain 1403 consisting of three blades 1403a, 1403b, 1403c and a first curtain 1404 consisting of three blades 1404a, 1404b, and 1404c. As shown by the second curtain 403, when blades of the second curtain 1403 and the first curtain 1404 are superimposed on each other, the openings 1401c and 1402c are opened. As shown by the first curtain 1404, when blades of the second curtain 1403 and the first curtain 1404 are unfolded, the openings 1401c and 1402c are closed. In order to open and close the openings 1401c and 1402c by the curtains 1403 and 1404 in cooperation with each other, the blades 1403a and 1404a are connected, outside the openings 1401c and 1402c, with vibrators 1405 and 1406, respectively mounted on the first walls 1401a and 1402a through each connecting portion 407. Similarly to the conventional driving mechanism, on the side opposite to the connecting portion 407, a link mechanism, not shown, is provided to vertically guide the blades 1403a, 1403b, 1403c and 1404a, 1404b, and 1404c. Although not shown, the vibrators 1405 and 1406 respectively comprise a piezoelectric element and an elastic member similarly to the ring-shaped ultrasonic wave motor to drive the diaphragm driving mechanism 1002. The vibrators 1405 and 1406 are elliptical and partly linear in the vertical direction thereof in conformity with the vertical movements of the blades 1403a and 1404a.

In this construction, progressive waves are generated on the surface of the vibrators 1405 and 1406 by applying an appropriate voltage thereto to vertically move the blades 1403a and 1404a connected with the vibrators 1405 and 1406. Thus, the openings 1401c and 1402c can be opened and closed. That is, as described previously, the blade 1403a is moved upward from the position as shown in FIG. 12 to close the openings 1401c and 1402c, and the blade 1404a is moved upward from the position as shown in FIG. 12 to open the openings 1401c and 1402c. An exposure can be carried out at an appropriate shutter speed by appropriately setting the vertical length of a slit formed by the blades 1403a, 1403b, 1403c, 1404a, 1404b, and 1404c in consideration of the speeds thereof.

The shutter mechanism as described above eliminates the provision of a mechanism for converting a rotary movement into a linear movement unlike the conventional mechanism. Therefore, the shutter can be efficiently opened and closed. Further, a compact camera can be manufactured because the space of the shutter curtain is utilized as the space for placing the ultrasonic wave motor and it is unnecessary to provide a mechanism for charging a spring for the curtain.

As described above, since each mechanism is provided with an ultrasonic wave motor suitable for its operation, it is unnecessary to provide means for mechanically interlocking the operations of the mechanisms. In addition, the utilization of the characteristic feature of the ultrasonic wave motors eliminates the provision of a speed reducing mechanism. Accordingly, a compact camera is obtainable and power transmission among the mechanisms can be efficiently accomplished and the operations thereof are reliable.

Next, detailed description is made on the photographing lens barrel of a lens shutter camera comprising a rotatory barrel driving device utilizing an ultrasonic wave motor with reference to FIGS. 13 through 18.

Figure 13:
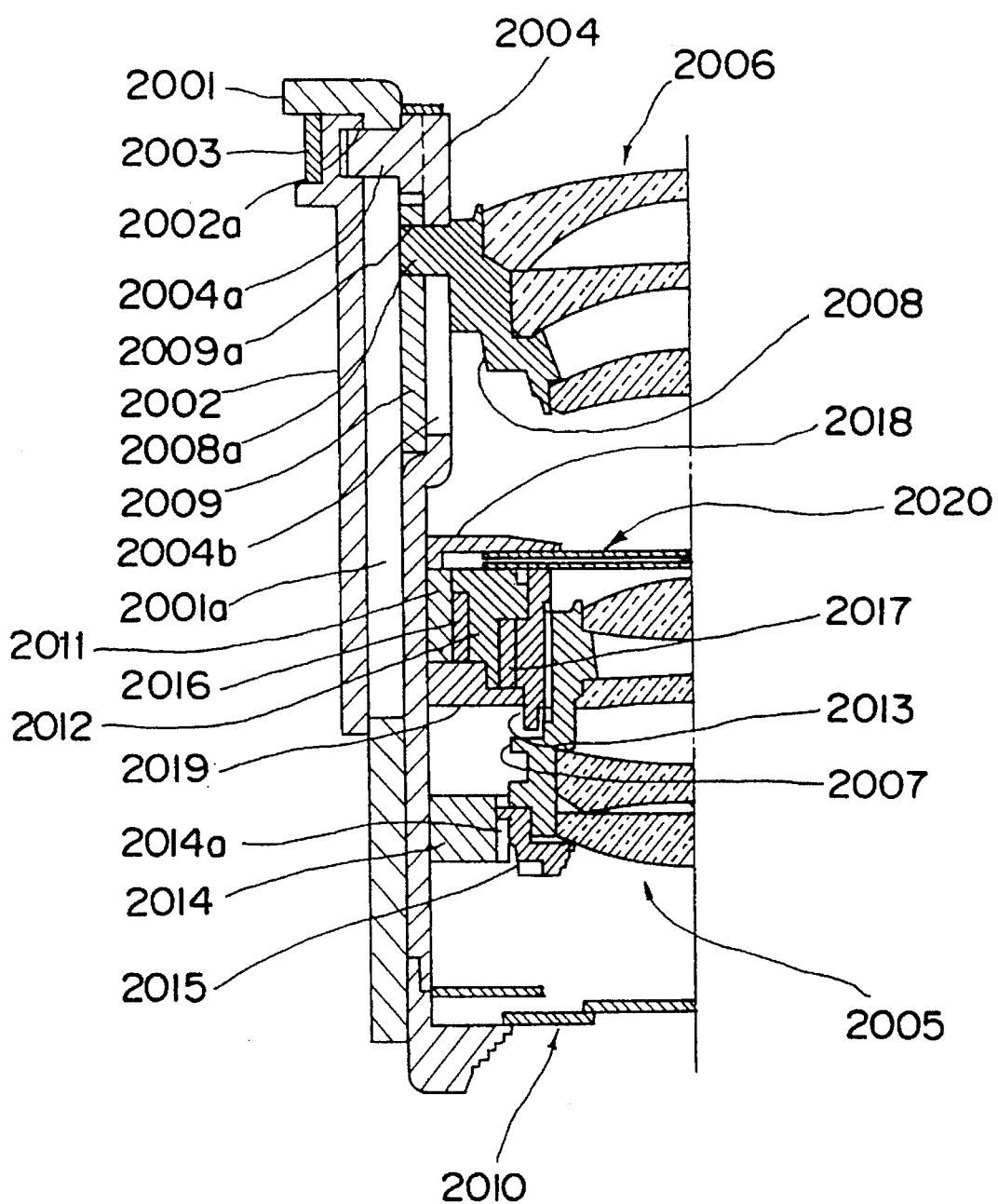
FIGS. 13 and 14 are semi-sectional view, of a photographing lens barrel, according to a further embodiment of the present invention, provided with a rotatory barrel driving device using an ultrasonic wave, at the wide angle side and the telescopic side, respectively.
Figure 14:
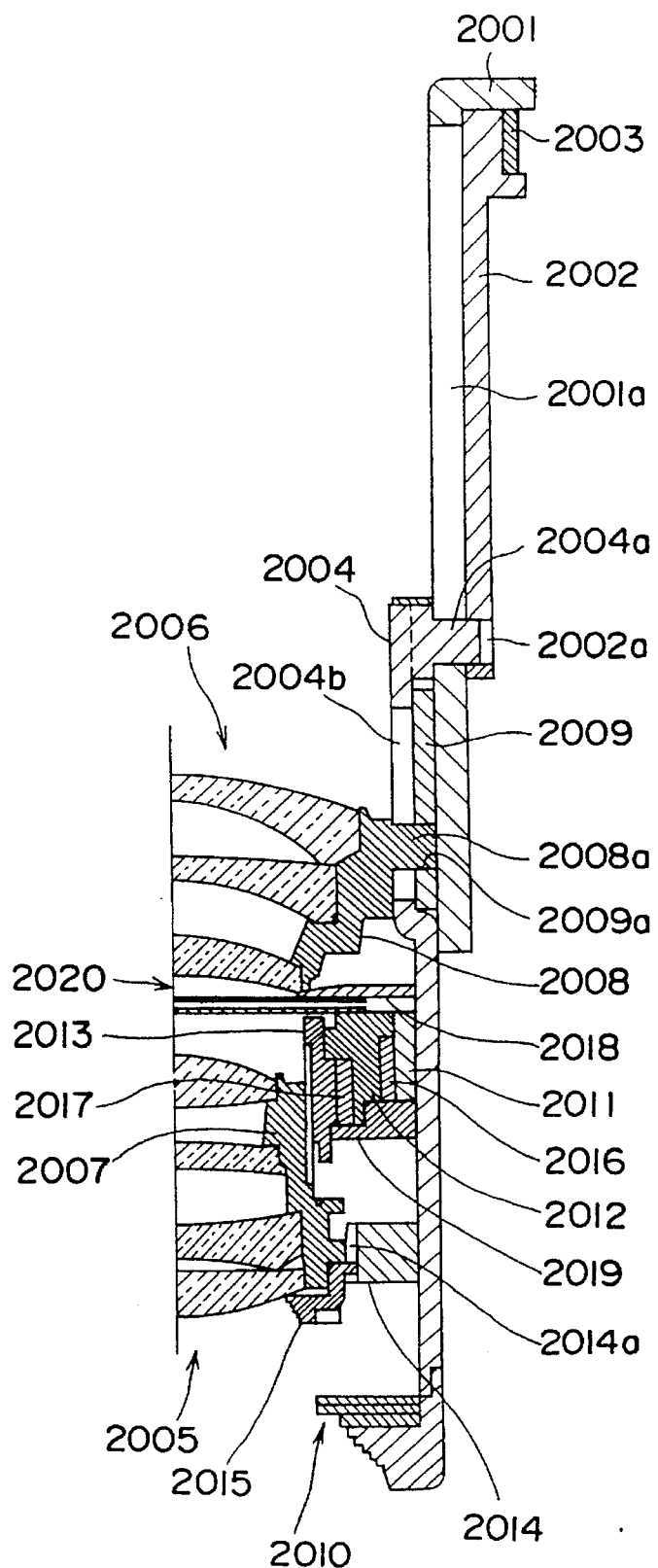

FIGS. 13 and 14 are sectional views of a photographing lens barrel in the state in which the photographing lens is positioned on the wide angle side and the telescopic side, respectively. The lens barrel comprises a stationary barrel 2001 fixed to the camera body, a first rotatory barrel 2002 rotatably mounted on the stationary barrel 2001, and a linear movement barrel 2004 slidable on the stationary barrel 2001 along the optical axis. The lens barrel accommodates a first lens group 2005 held by a first holding frame 2007 and a second lens group 2006 held by a second holding frame 2008. A lens barrier 2010 is mounted on the front end of the lens barrel so that the lens barrier 2010 protects the lenses when the main power is off.

A linear groove 2001a is formed on the stationary barrel 2001. A spiral cam groove 2002a is formed on the first rotatory barrel 2002. A pin 2004a which is fitted in the grooves 2001a and 2002a is formed on the linear movement barrel 2004 so that the linear movement barrel 2004 moves along the optical axis according to the rotation of the first rotatory barrel 2002. A second rotatory barrel 2009 which moves along the optical axis according to the rotation of the first rotatory barrel 2002 and rotates together with the first rotatory barrel 2002 is provided between the stationary barrel 2001 and the linear movement barrel 2004. A spiral cam groove 2009a is formed on the second rotatory barrel 2009. A linear groove 2004b is formed on the linear movement barrel 2004. A pin 2008a fitted in the grooves 2009a and 2004b is formed on the second holding frame 2008. When the photographing lens is driven to move to the telescopic side by the rotation of the first rotatory barrel 2002, the linear movement barrel 2004 slides on the stationary barrel 2001 along the optical axis and the second lens group 2006 moves forward along the optical axis with respect to the linear movement barrel 2004.

Figure 15:
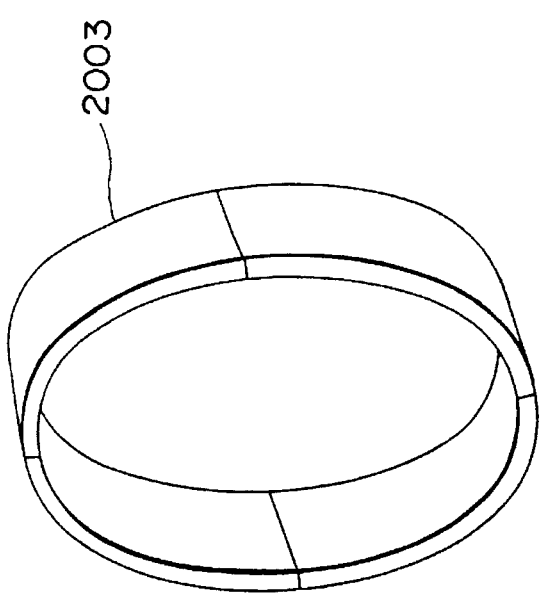
Fig. 15 is a perspective view of a vibrator for use in the rotatory barrel driving device.
Figure 16:
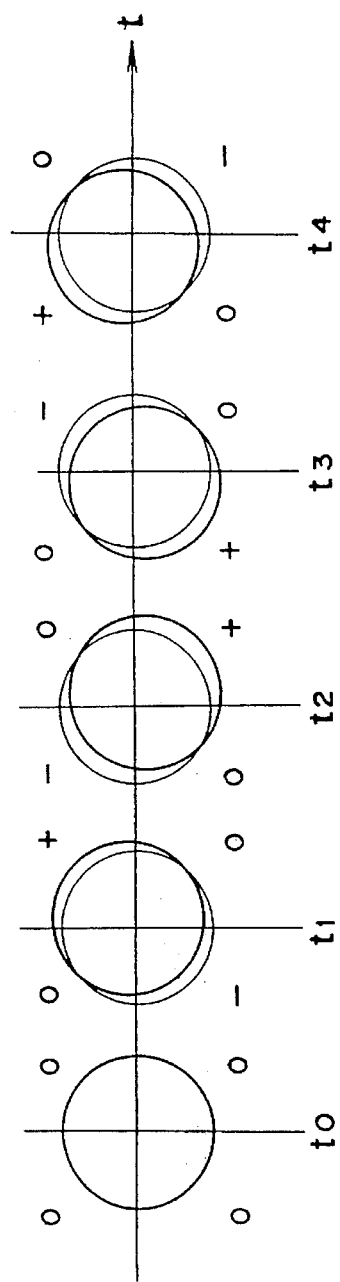
FIG. 16 is a view showing the vibration conditions of the vibrator which changes with the elapse of time.

In order to rotate the rotatory barrel 2002, in this lens barrel, the ring-shaped vibrator 2003 shown in FIG. 15 is mounted on the stationary barrel 2001 in such a condition that the vibrator 2003 contacts the periphery of the rotatory barrel 2002 at a point thereof. Thus, an electrostrictive revolution vibrator type ultrasonic wave motor comprising the rotatory barrel 2002 serving as the rotor is constituted. The vibrator 2003 comprises a ring-shaped piezoelectric element and four-divided electrodes fixed to each surface of the piezoelectric element, thus generating a vibration having a mode as shown in FIG. 16. FIG. 16 shows the change in the vibration of the vibrator 2003 with the elapse of time. At a point $t_0$, the vibrator 2003 does not vibrate. Positive and negative voltages are sequentially applied to the four pairs of electrodes at positions shown by (+) and (−). As a result, the vibrator 2003 deforms in such a manner that it expands toward the side in which a positive voltage has been applied. As shown by $t_2$ through $t_4$, with the sequential change of the voltage application position, the vibrator 2003 keeps deformation with the center of the deformed vibrator 2003 revolving around the center of the original position of the vibrator to which a voltage is not applied. Accordingly, since the vibrator 2003 vibrates in an elliptical configuration at a point thereof, the rotatory barrel 2002 rotates in the same direction as the vibration direction of the vibrator 2003. Thus, the photographing lens can be zoomed.

Next, a device for driving the lens shutter 2020 is described below.

Figure 17:
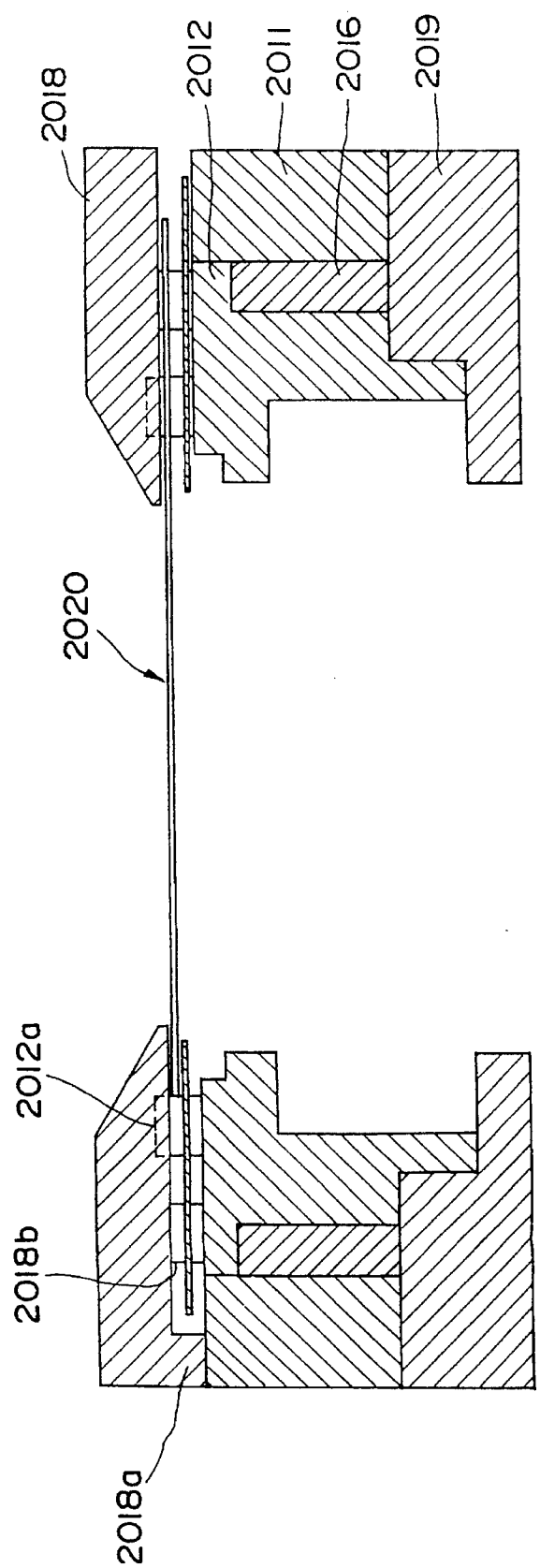
FIG. 17 is an enlarged sectional view of the mechanism for opening and closing a shutter blade.
Figure 18:
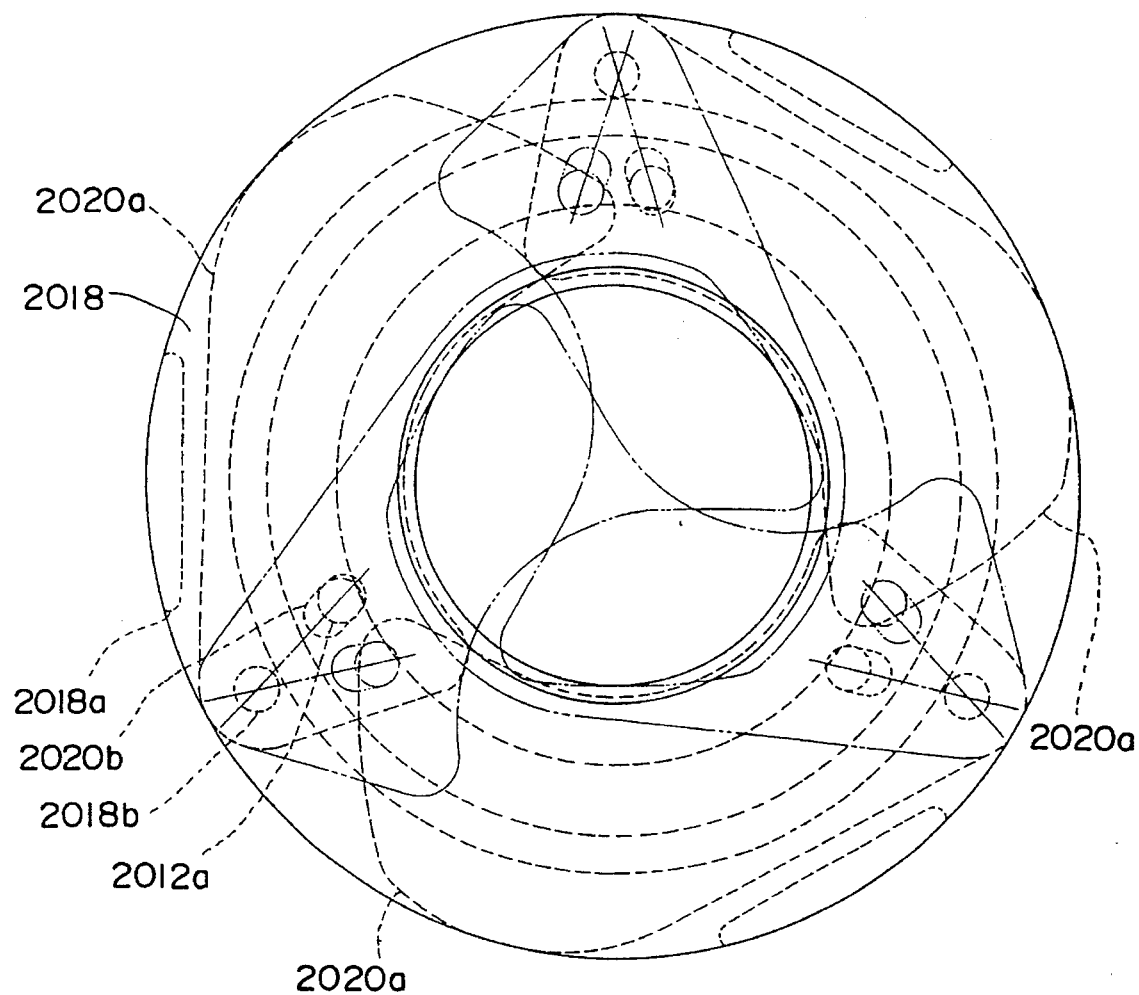
FIG. 18 is a plan view of the mechanism shown in FIG. 17.

The device comprises a ring member 2011 serving as a second stationary barrel, a ring sector 2012 serving as a second rotatory barrel, a vibrator 2016 comprising a piezoelectric element and four-divided electrodes similarly to the above-described vibrator 2003, a first substrate 2018 and a second substrate 2019 fixed to the ring member 2011. FIGS. 17 and 18 are an enlarged sectional view and a plan view of the above-described members, respectively. The shutter 2020 comprises three blades 2020a rotatably mounted on a fulcrum shaft 2018b of the first substrate 2018 fixed to the ring member 2011 at a projection 2018a. Driving shafts 2012a formed at three positions of the ring sector 2012 engage each slot 2020b formed on each blade 2020a. Accordingly, referring to FIG. 18, the shutter 2020 can be set in an open state shown by broken lines and a closed state as shown by imaginary lines by applying a voltage to the vibrator 2016 so as to rotate the ring sector 2012.

Referring to FIGS. 13 and 14, in the second substrate 2019, a third vibrator 2017 serving as a means for driving the photographing lens for a focusing operation is mounted on the inner side of the ring sector 2012. A third rotatory barrel 2013 screwed on the holding frame 2007 of the first lens group 2005 is provided on the inner side of the third vibrator 2017. The second substrate 2019 prevents the third rotatory barrel 2013 from being removed therefrom. A ring 2015 which engages the guide member 2014 having the linear guide groove 2014a formed thereon is mounted on the leading end of the holding frame 2007. Accordingly, when the third rotatory barrel 2013 is rotated by exciting the vibrator 2017, the holding frame 2017 linearly moves along the optical axis. Thus, focusing can be carried out according to a zooming position.

As described above, the three vibrators 2003, 2016, and 2017 are provided and the electrostrictive vibrator type ultrasonic wave motor in which the rotatory barrel 2002, 2012, and 2013 serve as rotors is constituted to perform zooming, focusing, and operation for opening and closing the shutter. Therefore, compared with the conventional mechanism in which an electromagnetic motor is used, a compact camera can be manufactured at a low cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera with a changeable lens system which is driven by a driving force for auto focusing transmitted from a camera body comprising:

an ultrasonic wave motor with a driving shaft, which generates the driving force to drive the changeable lens system; and a coupler member having an output portion which engages with a driven coupler provided in the lens system so as to transmit the driving force from the ultrasonic motor to the lens system, wherein the driving shaft and the coupler member are coaxially provided and directly connected to each other so that a rotation of the shaft agrees with that of the coupler member.

2. A camera as claimed in claim 1, wherein the ultrasonic wave motor is a torsion connector-type ultrasonic wave motor.

3. A camera as claimed in claim 1, wherein the ultrasonic wave motor is a composite vibrator-type ultrasonic wave motor.

4. A camera with a changeable lens system which is driven by a driving force transmitted from a camera body comprising:

an ultrasonic wave motor with a driving shaft, which generates the driving force to drive the changeable lens system; and a coupler member having an output portion which engages with a driven coupler provided in the lens system so as to transmit the driving force from the ultrasonic motor to the lens system, wherein the driving shaft and the coupler member are directly connected to each other so that a rotation direction and a rotation speed of the shaft agree with those of the coupler member.

5. A camera as claimed in claim 4, wherein the ultrasonic wave motor is a torsion connector-type ultrasonic wave motor.

6. A camera as claimed in claim 4, wherein the ultrasonic wave motor is a composite vibrator-type ultrasonic wave motor.

* * * * *

UNITED STATES PATENT AND TRADEMARK OFFICE
CERTIFICATE OF CORRECTION

PATENT NO. : 5,467,158
DATED : November 14, 1995
INVENTOR(S) : Nobuharu Murashima, et al.

It is certified that error appears in the above-indentified patent and that said Letters Patent is hereby corrected as shown below:

In Col. 2, line 64, change "move" to --wave--.

In Col. 3, line 49, change "comprise" to --comprises--.

In Col. 4, lines 9, 11, 15, 17 and 28, change "folk" to --fork--.

In Col. 6, line 30, change "out" to --outputted--.

In Col. 6, line 56, change "a abrasion" to --an abrasion--.

In Col. 7, line 22, change "205" to --1205--.

In Col. 8, line 1, change "sown" to --shown--.

In Col. 8, line 48, change "403" to --1403--.

In Col. 8, lines 59 and 60, change "407" to --1407--.

Signed and Sealed this

Twenty-sixth Day of March, 1996

Attest:

BRUCE LEHMAN

Attesting Officer     Commissioner of Patents and Trademarks